United States Patent
Wei

(10) Patent No.: US 6,851,530 B2
(45) Date of Patent: Feb. 8, 2005

(54) COAXIAL WIRE STORAGE WHEEL

(76) Inventor: Jose Wei, P.O. Box No. 6-57, Junghe, Taipei 235 (TW)

(*) Notice: Subject to any disclaimer, the term of this patent is extended or adjusted under 35 U.S.C. 154(b) by 0 days.

(21) Appl. No.: 10/729,928

(22) Filed: Dec. 9, 2003

(65) Prior Publication Data

US 2004/0118651 A1 Jun. 24, 2004

(30) Foreign Application Priority Data

Dec. 19, 2002 (TW) ..................................... 91220676 U

(51) Int. Cl.⁷ .............................................. H02G 11/02
(52) U.S. Cl. ................................ 191/12.2 R; 191/12.4; 381/370
(58) Field of Search ........................ 191/12.2 R, 12 R, 191/12.2 A, 12.4, 12 C; 381/370, 384; 242/378.1

(56) References Cited

U.S. PATENT DOCUMENTS

| | | | | |
|---|---|---|---|---|
| 3,689,868 A | * | 9/1972 | Snyder ........................ | 439/501 |
| 3,853,285 A | * | 12/1974 | Woodring ................ | 242/378.1 |
| 5,544,836 A | * | 8/1996 | Pera ............................ | 242/372 |
| 6,305,632 B1 | * | 10/2001 | Hwang ..................... | 242/378.1 |
| 6,315,231 B1 | * | 11/2001 | Liaom ...................... | 242/378.1 |
| 6,397,991 B1 | * | 6/2002 | Chang ....................... | 191/12.4 |
| 6,439,360 B1 | * | 8/2002 | Miller ................... | 191/12.2 R |
| 6,474,585 B2 | * | 11/2002 | Liao ........................ | 242/378.1 |
| 6,497,378 B1 | * | 12/2002 | Liao ........................ | 242/378.1 |
| 6,658,130 B2 | * | 12/2003 | Huang ........................ | 381/384 |

* cited by examiner

Primary Examiner—Mark T. Le
(74) Attorney, Agent, or Firm—Troxell Law Office PLLC

(57) ABSTRACT

A coaxial wire storage wheel devise includes a wire storage turning wheel having an uniform diameter, a center hole jointed to a uni-axial portion, and a wheel plane distinguished into left and right wheel planes; a spiral spring having a bottom end thereof connected to the axial portion and an outer end thereof connected to the wheel plane of the wire storage turning wheel; a communication wire fastened at the wheel plane to form upper and lower wires; and a right wall body having an inner wall plane fixed to the axial portion inserted through a left wall body, and a wire storage groove formed at the left and right wheel planes. The wire storage groove is for winding and storing the upper and lower wires, thereby releasing the upper wire at the turning wheel with equal length and distance as those of the lower wire being simultaneously released.

8 Claims, 8 Drawing Sheets

COAXIAL WIRE STORAGE WHEEL

BACKGROUND OF THE INVENTION (a) Field of the Invention

The invention relates to a coaxial wire storage wheel, and more particularly, to a coaxial wire storage wheel having advancement over an earphone wire winding box with coaxial and dual wheels disclosed by U.S. Pat. No. 6,434,249 B1, such that lengths of upper and lower wires released are equal or approximately equal.

(b) Description of the Prior Art

According to "Earphone Wire Winding Box with Coaxial and Dual Wheels" disclosed in the U.S. Pat. No. 6,434,249 B1 by the inventor, a structure of this prior invention comprises:

a big turning wheel of a longer outer diameter and a small turning wheel of a shorter outer diameter with center holes thereof, wherein both of the center holes are respectively and lively jointed to a uni-axial portion;

storage grooves respectively formed at the wheel planes of the big and small turning wheels and for a communication wire to coil around therein; and a spiral spring having a bottom end thereof connected to the axial portion and an outer end thereof connected to an inwardly concaved wheel plane of the big turning wheel, thereby providing the big and small turning wheels with elastic rotating abilities.

During rotations of the big and small turning wheels, in specific, when an upper wire inside the storage groove of the big turning wheel is pulled out, a length of a lower wire being released is shorter than that of the upper wire because diameters of the big and small turning wheels are different.

This prior invention has certain drawbacks of:

1. The big and small turning wheels, and inner and outer wheel bodies, are targeted to be located at fixed positions, at belts, for example. Implementations of the prior invention are thus restricted as a communication wire winding device of a cellular phone.

2. A diameter ratio of the big and small turning wheels is rather too large that a ratio of released lengths of the upper and lower wires gets too large as well, and thus limiting application ranges of this prior invention.

SUMMARY OF THE INVENTION

The primary object of the invention is to provide a coaxial wire storage wheel device, in that a plane of a wire storage wheel is distinguished into left and right wheel planes having same outer diameters or a reduced difference in outer diameters, thereby releasing equal lengths or approximately equal lengths of upper and lower wires to further expand application ranges of the invention.

BRIEF DESCRIPTION OF THE DRAWINGS

To better understand the aforesaid object, functions and characteristics of the invention, detailed descriptions shall be given with the accompanying drawings below.

DETAILED DESCRIPTION OF THE PREFERRED EMBODIMENTS

Figure 1:
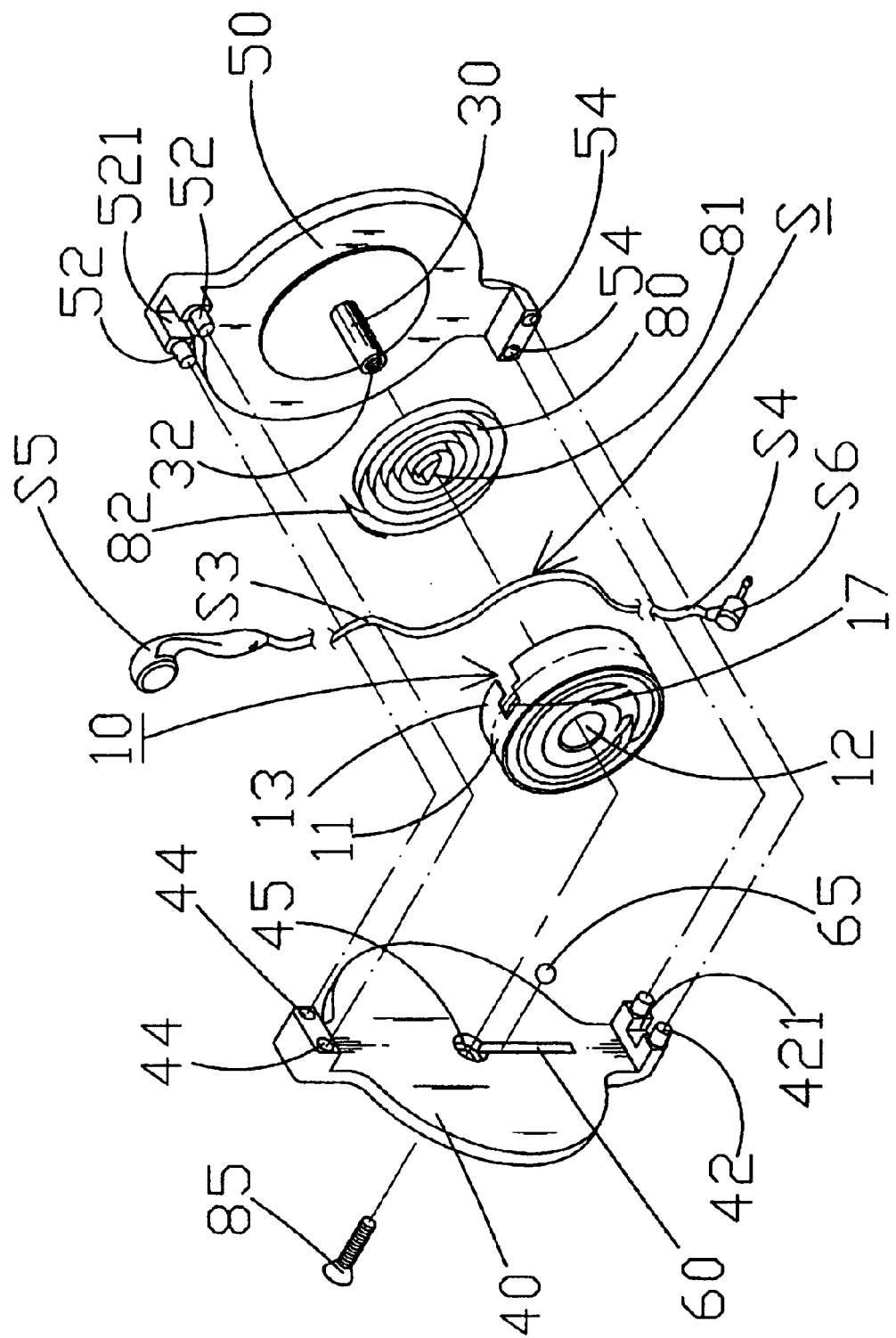
FIG. 1 shows an exploded elevational view according to the invention.
Figure 2:
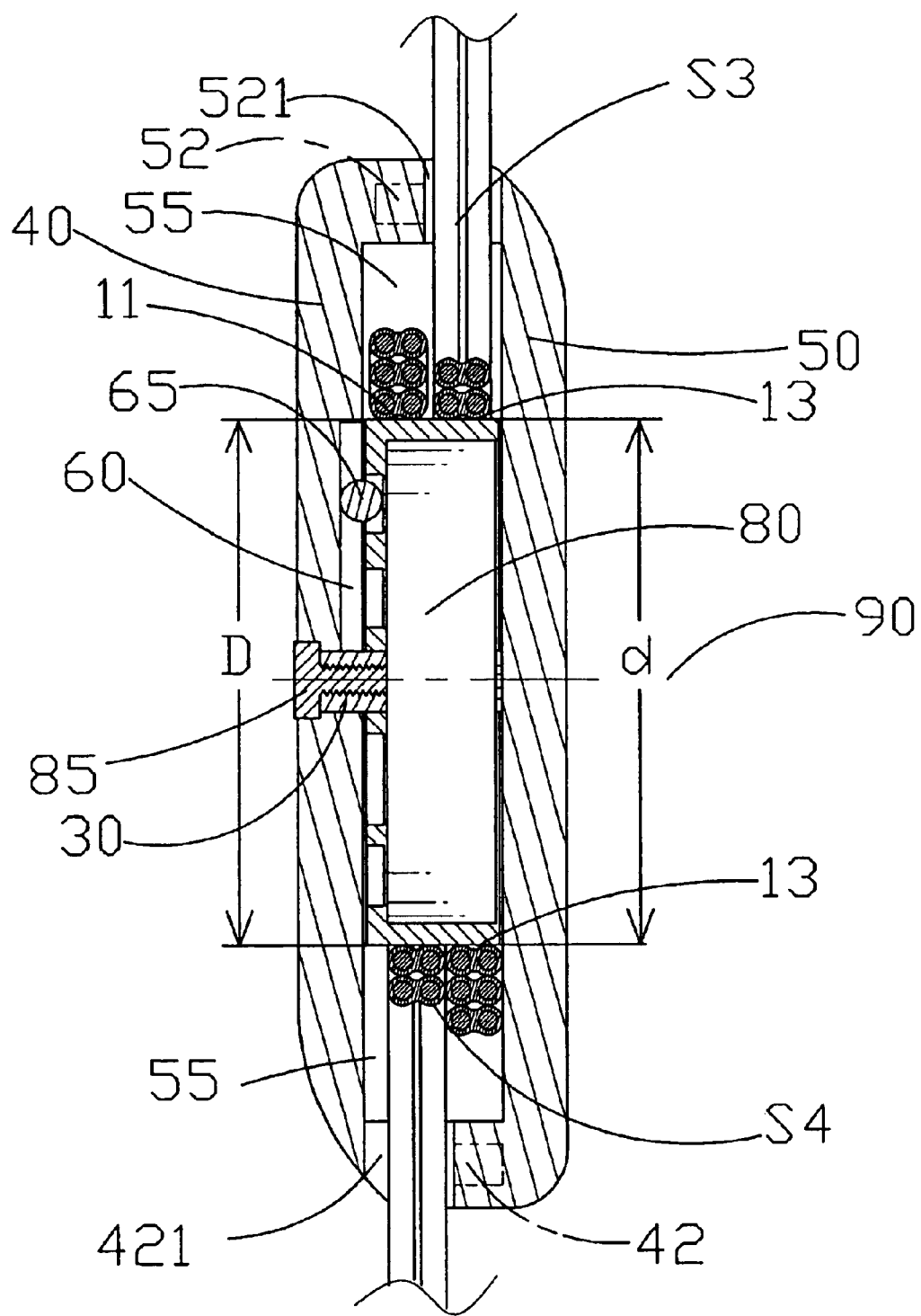
FIG. 2 shows a sectional view according to the invention.

With reference to FIGS. 1 and 2, the invention has structure characteristics of:

a wire storage turning wheel 10 having a uniform diameter, a center hole 12 jointed to a uni-axial portion 30, and a wheel plane distinguished into left and right wheel planes 11 and 13;

a spiral spring 80 having a bottom end 81 connected to the axial portion 30 and an outer end 82 connected to the wheel plane of the wire storage turning wheel 10;

a communication wire S with an appropriate distance fastened at the wheel plane, so as to define upper and lower wire S3 and S4; and a right wall body 50 having an inner wall plane thereof fixed to the axial portion 30 inserted through a left wall body 40, and a wire storage groove 55 formed at the left and right wheel planes 11 and 13; wherein, the wire storage groove 55 is for winding and storing the upper and lower wires S3 and S4, thereby releasing the upper wire S3 at the turning wheel 10 with equal length and distance as those of the lower wire S4 being simultaneously released.

According to the aforesaid characteristics, the left and right wheel planes 11 and 13 are for storing the upper and lower wires S3 and S4, respectively. In order to control a length ratio of the upper and lower wires S3 and S4 released from the wire storage grooves 55, outer diameters D and d of the left and right wheel planes 11 and 13 can be individually devised according to a user's needs.

According to the aforesaid primary characteristics, the left and right wheel planes 11 and 13 have a mutual rotation centerline 90.

Figure 3:
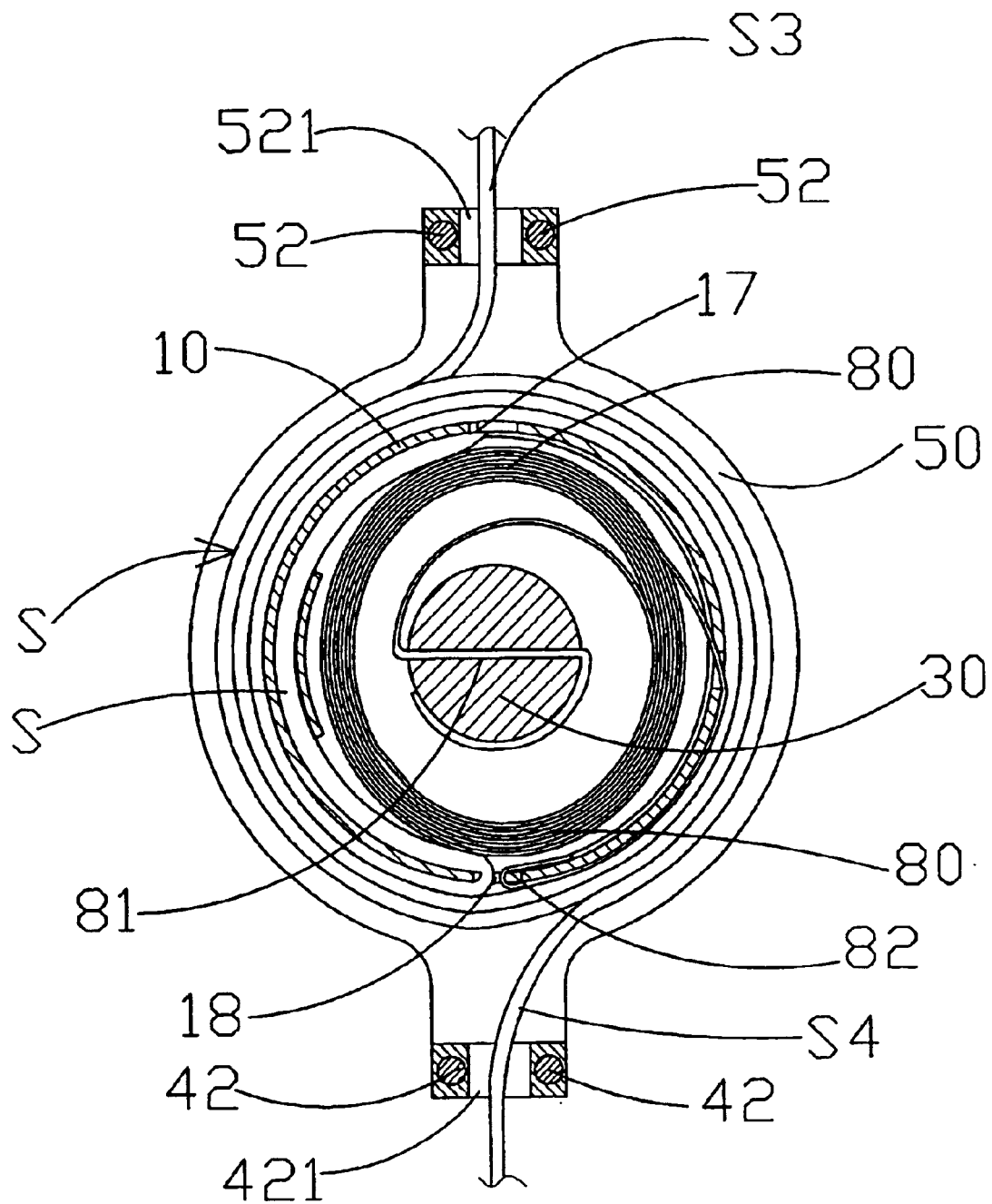
FIG. 3 shows another sectional view according to the invention.

According to the aforesaid primary characteristics, the wheel plane of the turning wheel 10 has two notches 17 and 18, such that the wire signal S is wedged and positioned at the two notches 17 and 18 to define upper and lower wires S3 and S4 (as shown in FIG. 3).

According to the aforesaid primary characteristics, two ends of the communication wire S may be devised as a plug S6 and a socket S2 for conducting electricity, respectively.

According to the aforesaid primary characteristics, two ends of the communication wire S may be devised as a plug S5 and a socket S6 for transmitting signals, respectively.

According to the aforesaid primary characteristics, the left and right wall bodies 40 and 50 have upper and lower ends thereof formed with insertion posts 52 and 42, and insertion holes 54 and 44, respectively. Wherein, the insertion posts 52 and 42 are inserted into the insertion holes 54 and 44, so as to join the left and right wall bodies 40 and 50. Between each two adjacent insertion poles 52 and 42 are respectively formed with insertion groove 521 and 421 for extending the upper and lower wires S3 and S4 therein to an exterior.

According to the aforesaid primary characteristics, to join the left and right wall bodies 40 and 50, a screw 85 is screwed from the center hole 45 of the left wall body 40 into a screw opening 32 of the axial portion 30.

Figure 6:
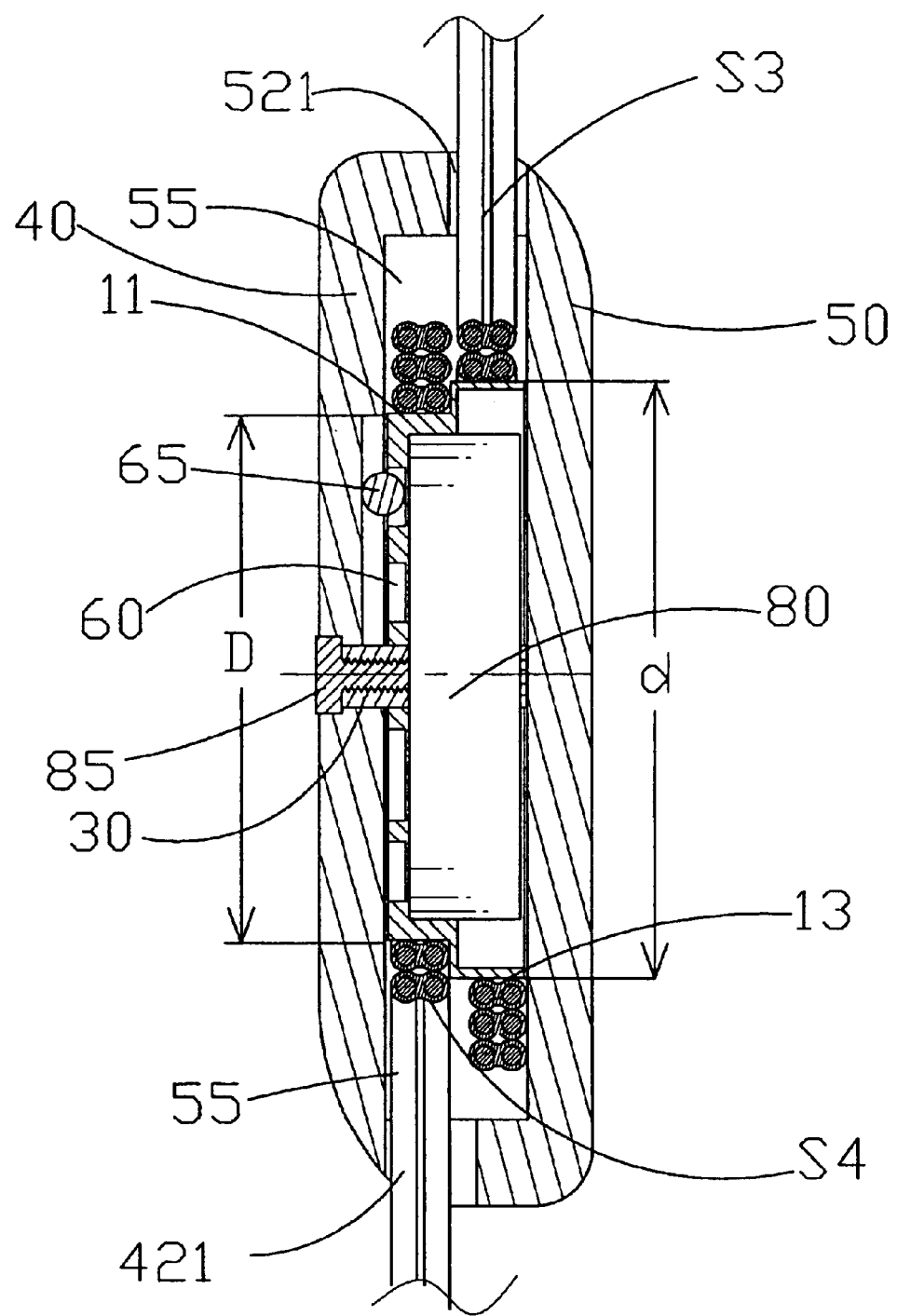
FIG. 6 shows a sectional view illustrating wheel planes having different diameters in an embodiment according to the invention.

The invention is put to application using the following methods:

1. Referring to FIG. 1, a distinguishing characteristic of the invention is that the prior coaxial dual wheels as disclosed in U.S. Pat. No. 6,434,249 B1 are modified into an independent coaxial turning wheel 10, which regards the centerline 90 as a center of rotation. The wheel plane of the turning wheel 10 is virtually divided into the left and right wheel planes 11 and 13. In a preferred embodiment according to the invention, the left and right wheel planes 11 and 13 respectively have outer diameters D and d that are equal. However, the outer diameters D and d may also be different. For same outer diameters D and d of the left and right wheel planes 11 and 13, when the upper wire S3 or the lower wire S4 is pulled out of the wire storage groove 55, the turning wheel 10 rotates with elastic rotations regarding the axial portion 30 as a center of rotation in the effect of the spiral spring 80 as shown in FIGS. 2 and 3, with the lower wire S4 descended and extended out of the wire storage groove 55. Because the outer diameters D and d are equal, lengths of the upper and lower wires S3 and S4 released are equal as well. Supposed the outer diameters D and d are devised as different as shown in FIG. 6, lengths of the upper and lower wires S3 and S4 released consequently become different. When pulling forces upon the upper and lower wires S3 and S4 discharged, contraction of the spiral spring 80 compels the turning wheel 10 to rotate in a reverse direction, thereby winding the wire and restoring the upper and lower wires S3 and S4 back to the wire storage groove 55. Thus, the wire is orderly stored to prevent messy wire arrangements at a working environment.

Figure 4:
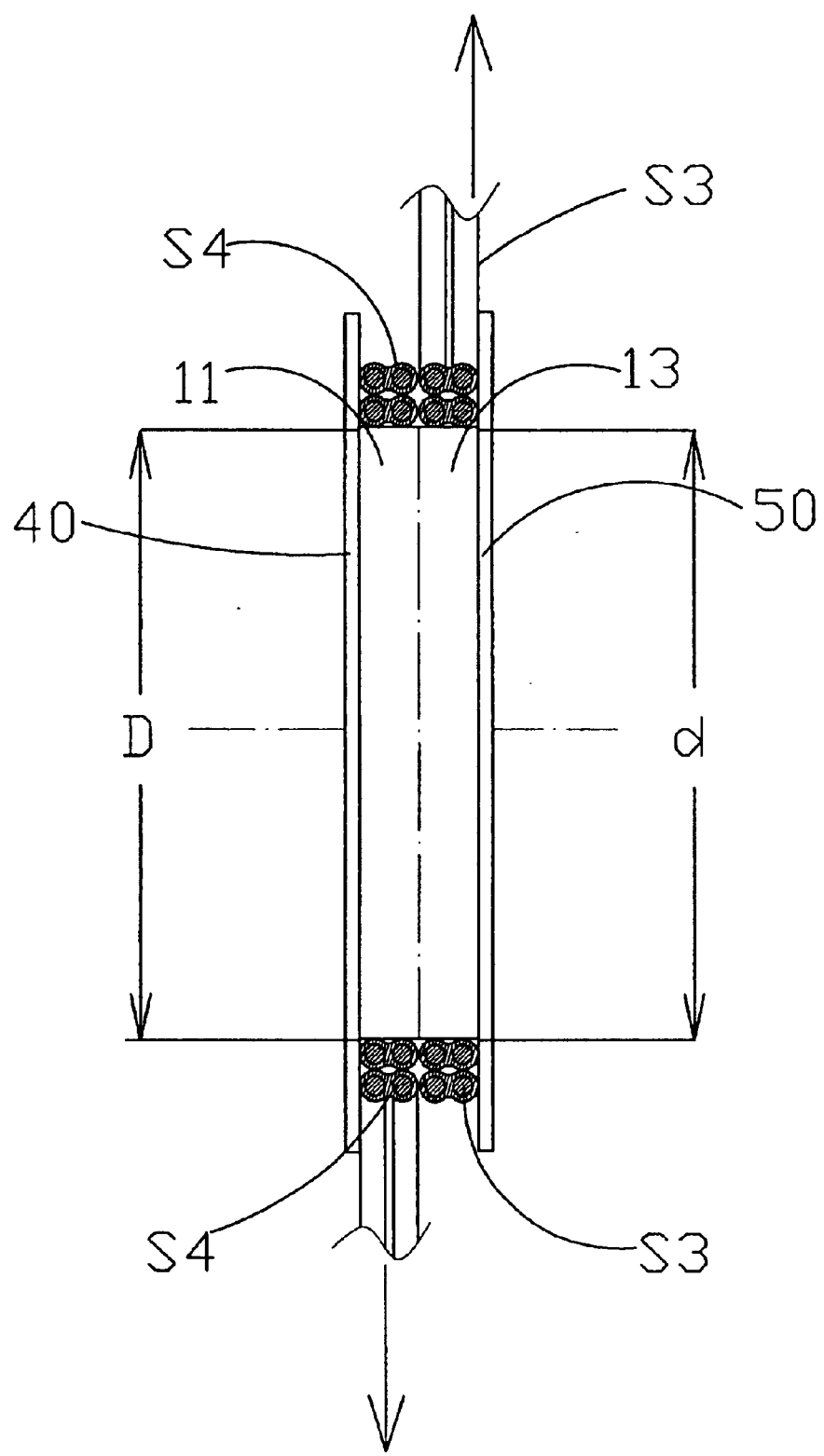
FIG. 4 shows a planar schematic view illustrating movements according to the invention.
Figure 5:
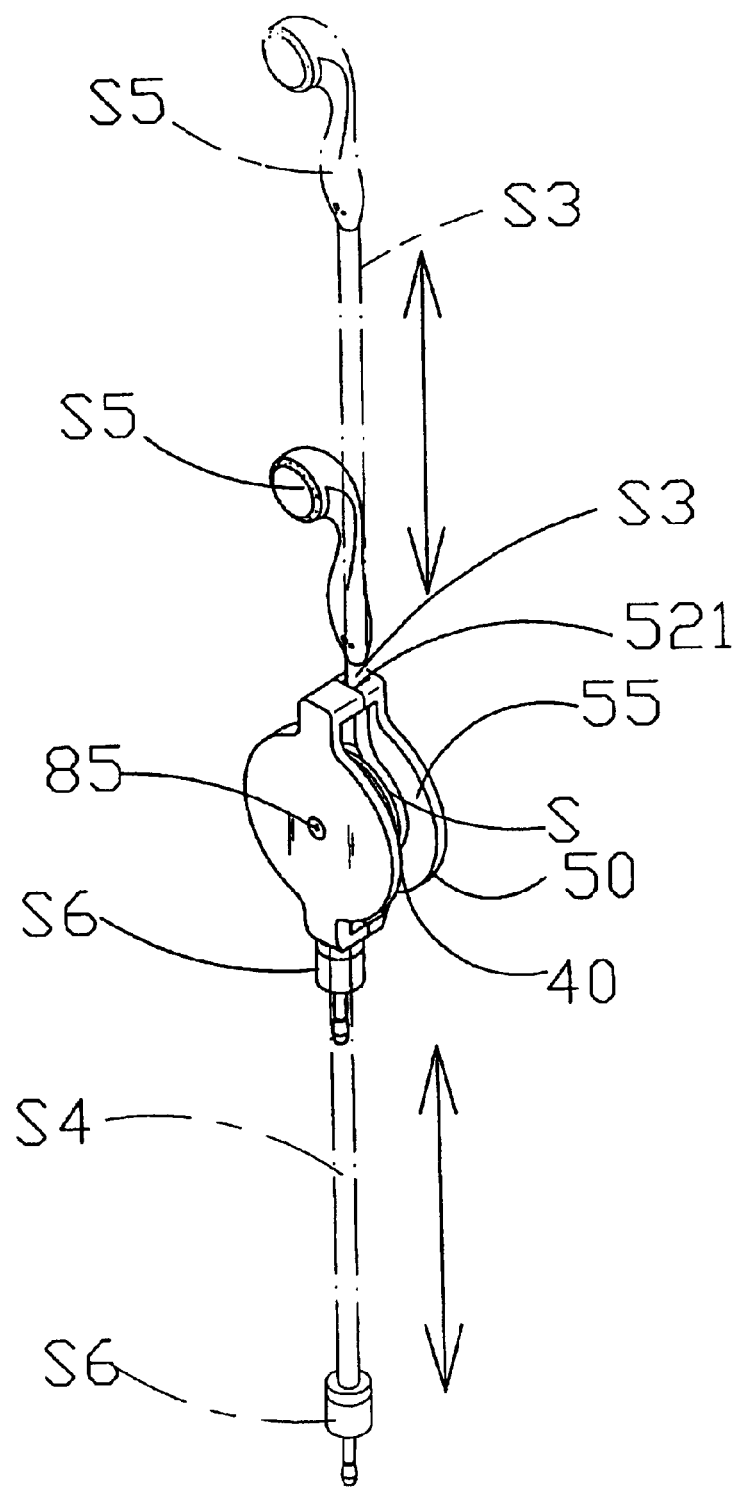
FIG. 5 shows an elevational view illustrating movements in an embodiment according to the invention.

2. By joining the left and right wall bodies 40 and 50, the wire storage groove 55 is defined at the turning wheel 10, so that the upper and lower wires S3 and S4 can be winded and stored in the wire storage groove 55 as shown in FIG. 4. At the same time, for extending and withdrawing the upper and lower wires along particularly directions, the insertion grooves 521 and 421 are also formed between each two adjacent insertion poles 52 and 42, respectively, as shown in FIG. 5. Also, designs of the notches 17 and 18 are for positioning the communication wire S and for further defining the upper and lower wires S3 and S4.

Figure 7:
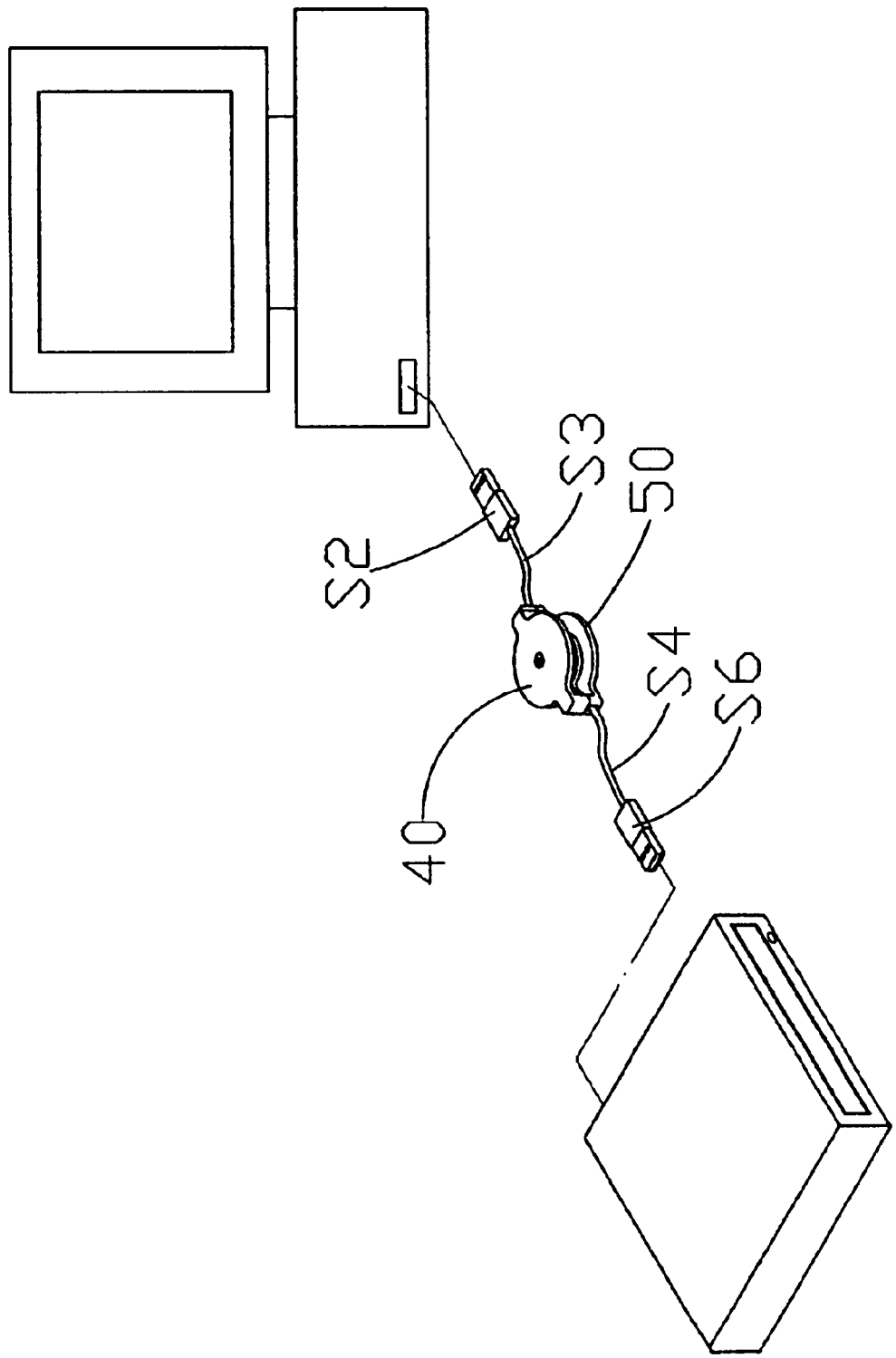
FIG. 7 shows an elevational schematic view illustrating the invention being applied and plugged with an electric appliance.
Figure 8:
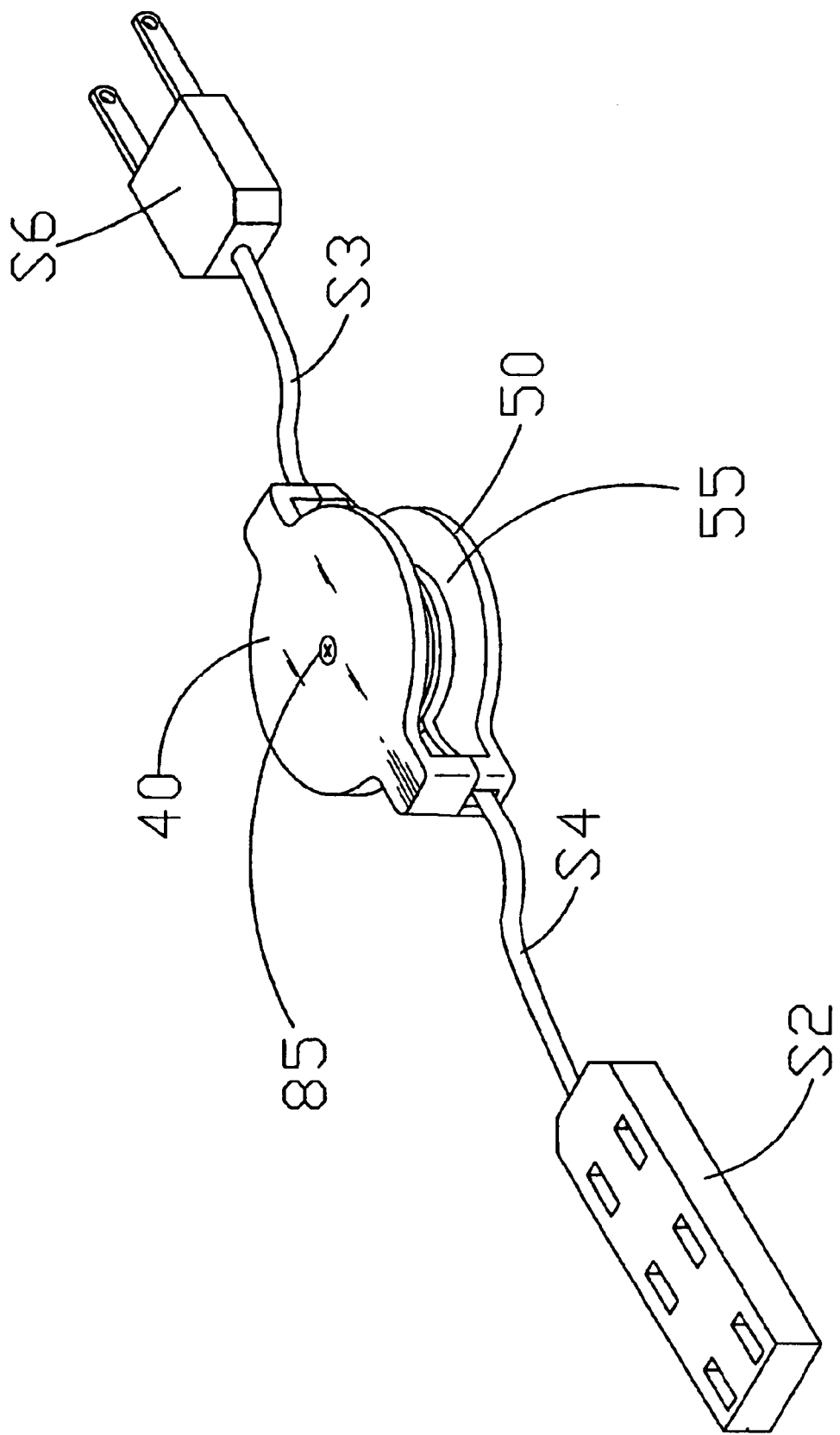
FIG. 8 shows an elevational illustrating the upper and lower wires having a plug and a socket at end portions thereof in another embodiment according to the invention.

3. With reference to FIGS. 7 and 8, an end portion of the upper and lower wires S3 and S4 is connected to a plug S6 in various specifications and shapes, while the other end portion is connected to various sockets S2 or an earphone S5, such that the upper and lower wires S3 and S4 may serve as connecting communication wires of all kinds of electric appliances. Hence, the wire storage groove 55 functions as a wire storage device by storing a large amount of upper and lower wires S3 and S4, thereby preventing long communication wires from making a work environment appear disordered. In addition, for offering the upper and lower wires S3 and S4 with temporary positioning effects when the upper and lower wires S3 and S4 are pulled out, the turning wheel 10 according to the invention is provided with a concaved wheel plane 60 and a roller 65.

However, such structures are not within the characteristics of the invention and therefore shall not be unnecessarily illustrated.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A coaxial wire storage wheel device comprising:

a) a left wall body;

b) a right wall body having an inner plane wall and an axial portion connected to the left wall body, each of the left and the right wall bodies have a plurality of insert holes located on a first end and a plurality of insert posts located on a second end, each of the plurality of insert posts is aligned with and inserted into one of the plurality of insert holes, each of the left and the right wall bodies include an insertion groove located between two adjacent insert posts of the plurality of insert posts;

c) a wire storage turning wheel located between the left and the right wall bodies and having:
  i) a center hole, the axial portion is inserted through the center hole;
  ii) a wheel plane located on an outer diameter and divided into left and right wheel planes; and
  iii) two notches;

d) a spiral spring having a bottom end connected to the axial portion and a outer portion connected to the wheel plane;

e) a wire storage groove located between the left and the right wheel planes and an interior of the left and right wall bodies; and f) a communication wire having upper and lower wire portions, the communication wire is inserted through each of the two notches between the upper and lower wire portions, the upper and the tower wire portions are removably wound around the wheel plane.

2. The coaxial wire storage wheel device according to claim 1, wherein the left and the right wheel planes have outer diameters that are different.

3. The coaxial wire storage wheel device according to claim 1, wherein the left and the right wheel planes have outer diameters that are equal.

4. The coaxial wire storage wheel device according to claim 1, wherein the wherein the left and the right wheel planes have a common rotational centerline.

5. The coaxial wire storage wheel device according to claim 1, wherein each of two ends of the communication wire includes one of a plug and a socket for transmitting signals.

6. The coaxial wire storage wheel device according to claim 1, wherein each of two ends of the communication wire includes one of a plug and a socket for conducting electricity.

7. The coaxial wire storage wheel device according to claim 1, further comprising a screw, the left wall body includes a center hole, the axial portion of the right wall body is inserted into the center hole and secured therein by the screw inserted into a screw opening in the axial portion.

8. The coaxial wire storage wheel device according to claim 1, further comprising a roller located between a concave wheel plane of the left wall body and the wire storage turning wheel.

* * * * *